(12) United States Patent
    Tulsidas

(10) Patent No.: US 10,970,953 B2
(45) Date of Patent: Apr. 6, 2021

(54) FACE AUTHENTICATION BASED SMART ACCESS CONTROL SYSTEM

(71) Applicant: Techolution LLC, New York, NY (US)

(72) Inventor: Luv Tulsidas, New York, NY (US)

(*) Notice: Subject to any disclaimer, the term of this patent is extended or adjusted under 35 U.S.C. 154(b) by 138 days.

(21) Appl. No.: 16/361,174

(22) Filed: Mar. 21, 2019

(65) Prior Publication Data

US 2020/0302715 A1    Sep. 24, 2020

(51) Int. Cl.
    *G07C 9/37*     (2020.01)
    *G06K 9/00*     (2006.01)
    *G06K 9/03*     (2006.01)
    *G06K 9/62*     (2006.01)
    *G06T 7/20*     (2017.01)

(52) U.S. Cl.
    CPC .......... *G07C 9/37* (2020.01); *G06K 9/00228* (2013.01); *G06K 9/00288* (2013.01); *G06K 9/036* (2013.01); *G06K 9/6201* (2013.01); *G06K 9/6255* (2013.01); *G06T 7/20* (2013.01); *G06T 2207/30201* (2013.01)

(58) Field of Classification Search
    CPC ...... G07C 9/37; G06K 9/00288; G06K 9/036; G06K 9/6201; G06K 9/00228; G06K 9/6255; G06T 7/20; G06T 2207/30201
    See application file for complete search history.

(56) References Cited

U.S. PATENT DOCUMENTS

| 2004/0015495 A1* | 1/2004 | Kim ................... G06K 9/6234 |
| 2004/0022432 A1* | 2/2004 | Hayata ................ G06K 9/3241 382/159 |
| 2007/0252001 A1* | 11/2007 | Kail .................... G07C 9/33 235/380 |
| 2008/0144891 A1* | 6/2008 | Hwang .............. G06K 9/00268 382/118 |
| 2009/0060293 A1* | 3/2009 | Nagao ............... G06K 9/00221 382/118 |
| 2013/0015946 A1* | 1/2013 | Lau ..................... G06F 21/32 340/5.2 |
| 2015/0113632 A1* | 4/2015 | Saito ................. G06K 9/00906 726/16 |
| 2020/0122333 A1* | 4/2020 | Park ..................... B25J 13/003 |

* cited by examiner

*Primary Examiner* — Wesley J Tucker
(74) *Attorney, Agent, or Firm* — Mestechkin Law Group P.C.

(57) ABSTRACT

A novel method and apparatus for face authentication is disclosed. The disclosed method comprises detecting a motion by a subject within a predetermined area of view, assigning a unique session identification number to the subject detected within a predetermined area of view, detecting a facial area of the subject detected within a predetermined area of view, generating an image of the facial area of the subject, assessing a quality of the image of the facial area of the subject, conducting an incremental training of the image of the facial area of the subject, determining an identity of the subject based on the image of the facial area of the subject, identifying an intent of the subject, and authorizing access to a point of entry based on the determined identity of the subject and based on the intent of the subject.

19 Claims, 2 Drawing Sheets

FACE AUTHENTICATION BASED SMART ACCESS CONTROL SYSTEM

FIELD OF INVENTION

The present disclosure generally relates to intelligent access control system in which facial recognition is used as means for authenticating the identity of the user. The disclosure finds extensive application in places like Airport, ATM Centre, Corporate, Commercial & Home Security. The application can be customized for authenticating the users for accessing any point of entry.

BACKGROUND & PRIOR ART

There are various places in day to day life, where access to assets and resources must be restricted to predefined users to ensure Safety & Security. There has been technology application like RFID Cards, Biometrics to ensure that the authorized person is entering the premises.

Initially, RFID Cards were used as an add-on to photo identity cards, but these cards need to be carried physically by the user at entry & exit. RFID cards require physical touch between the card and scanner & there is a possibility of card being carried by unauthorized person. Due to these challenges, Biometric based inventions are being developed.

IRIS signature is one of the biometric methods used for authentication, in this method individual IRIS structure signature is used to identify the user. IRIS technology needs the user to expose their eyes to the scanner hence it is sequential and time consuming. IRIS signature record needs the user to expose their eyes to scanner for a significant time, leading to strain in the eyes.

A second method of biometrics, which has become popular in recent times is face recognition. In this technology an individual's facial features are extracted from digital image and compared with the stored set of images. Traditionally, face recognition needed to capture an image of the subject person positioned in a certain way that tracks the image that is stored in a database for accurate face recognition. Computational algorithms analyse the relative position, size and shape of the eyes, nose, mouth, jaw, ears, etc. The extracted features are then used to identify the human face. In the prior art of the face recognition systems, the recognition of individuals is done for every individual frame received from the imaging device which is a fragmented method. There is still need for systems which can efficiently conduct face recognition with video input. Even though there are several known video-based face recognition systems, they are mainly used for surveillance needs, so their application as access control system is limited.

Prior art of the face recognition system suggests that there is a need for storing additional or new image of the same user as per the changes in the facial features in addition to the pre-trained face images. In few scenarios, access control system needs to cater to the multiple person entry and exit at same time, in such scenario a session-based tracking of the users is needed. Many of the access control systems cannot identify the person's intentions at the recognition point and require an interactive interface to guide the user, instructing the subject person to clear the sight of the camera to give way for others.

One of the key requirements for an efficient face recognition system is the ability to distinguish between spoof image against a real or live image. There is a possibility for an unauthorized entry of individuals if the face recognition system is not designed for spoof detection. There are few inventions that use hardware augmentation like microphone onto video camera to decide the liveliness of the individual being captured in the camera. A video with microphone might capture environmental noise and can lead to erroneous detection.

A majority of the face recognition systems store the acquired images on the cloud-based storage, this will lead to longer response time along with scope for data security breach. Keeping in view of the data & privacy protection of the individuals, the image and video data of the user's needs to be on-premise through a single network. The local storage mechanism along with local processor is needed for quick response.

In prior art, there are significant methods suggested for registering a new user for face authentication. In these systems user needs to cooperate with the system admin for complete registration. These systems need an external human involvement to register the user. With the advent of mobile technology, a user friendly Do It Yourself (DIY) interface needed for parallel registration of users in bulk numbers. A mobile based administration interface for usage statistics is needed. Typically, the access control privileges are dynamic in nature to enable the users to switch authentication from one door to other and for one door to many.

In majority of the access control systems the face recognition happens sequentially i.e. a single user gets recognized for each authentication session. This kind of system cannot efficiently handle the piggybacking and tailgating. Based on above review of prior art, there is a need for a smart Access control System employing an accurate and dependable face authentication system.

BRIEF DESCRIPTION OF THE INVENTION

In a preferred embodiment, the disclosed method comprises detecting, by a motion detection module, a motion by a subject within a predetermined area of view, assigning a unique session identification number to the subject detected within a predetermined area of view, detecting a facial area of the subject detected within a predetermined area of view, generating an image of the facial area of the subject, assessing a quality of the image of the facial area of the subject, wherein the assessing a quality of the image of the facial area of the subject comprises assessing whether the quality of the image of the facial area of the object equates predetermined metric of quality and, upon determining that the quality of the image of the facial area of the object is inferior to the predetermined metric of quality, discarding the image of the facial area of the subject and generating a second image of the facial area of the subject, conducing an incremental training of the image of the facial area of the subject, determining an identity of the subject based on the image of the facial area of the subject, identifying an intent of the subject, and authorizing access to a point of entry based on the determined identity of the subject and based on the intent of the subject.

The disclosed method also includes the steps of determining one or more additional subjects within the predetermined area of view and assigning a unique session identification number to each of the one or more additional subjects detected within a predetermined area of view.

The disclosed method also includes the steps of detecting whether the facial area of the subject is photographic image and, upon detecting that the facial area of the subject is a photographic image, generating a warning and restrict access to the access point.

DETAILED DESCRIPTION OF INVENTION

Face detection is a computer technology that determines shapes and sizes of human faces in digital images, which is a key technology in face information processing. It has been widely applied in pattern recognition and identity management, human computer interface and automatic video surveillance. Present invention is an improved combination of system and method for efficient facial recognition and authentication for granting access to a controlled area.

Figure 1:
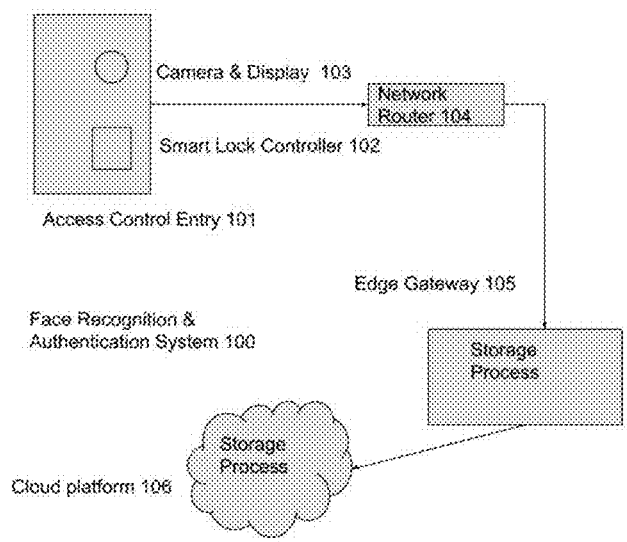
FIG. 1 illustrates disclosed a Facial Recognition & Authentication system, according to the preferred embodiment.

FIG. 1 depicts the disclosed Facial Recognition & Authentication system 100 configured to identify a subject person who is at or approaching an entry of access control point. The System 100 comprises: a smart lock controller 102, an image capture module 103, Network Router 104, Edge Gateway 105, and Cloud Platform 106.

A person ordinarily skilled in the art would understand that smart lock controller 102 is configured to implement the authentication where authentication, refers to process of validating user as one of the predefined persons to enter the controlled area. In an embodiment, image capture module 103, comprising of one or more high-resolution digital camera units, located in a proximity to the access control point, configured to capture an image of a subject person and a high-resolution digital display unit configured to display an image of the subject person captured by the high-resolution digital camera unit. Network Router 104 is configured to facilitate communicative connection between the elements of the System 100 and to facilitate transmission of captured images of subject people to be stored on Edge Gateway 105 and, then, on the Cloud Platform 106.

In an embodiment, Edge Gateway 105 serves as an on-site data storage, enabling an operator of the System 100 to access captured images of subject people on site. (Where onsite refers to, inbuilt capability of the camera to store and conduct face recognition within the embedded processor. All the data will be stored within the edge system locally) while Cloud Platform 106 serves as an off-site data storage, enabling access to captured images of subject people from anywhere. (In off-site method, the captured image/video is sent to remote server to conduct facial recognition.) The System 100 also comprises a registration module 101 configured to register subject person. It is to be understood that all described elements of the System 100 are communicatively interconnected via a communication network.

During long-term operation of face recognition system, the substantial amount of data generated by Edge Gateway 105 will necessitate a transfer of such data to Cloud Platform 106 for storage and future retrieval.

The Edge Gateway 105 has built-in capability to store and process the images and videos captured with camera 103.

The smart lock controller 101 is configured to be integrated into a structure of an access point (e.g., door, gate, and the like) for lock and unlock action.

In one of the embodiments, the Smart Lock Controller 101 also comprises a processor and local memory module, where the local memory module is configured to store computer program which, when executed by the processor, is configured to execute the method of facial recognition and authentication, as described herein.

Edge Gateway 105 comprises storage and processing hardware and software. Specifically, the Local Gateway 105 comprises one or more processors, such as, for example, any of the variants of the Intel Xeon family of processors, or any of the variants of the AMD Opteron family of processors.

In one embodiment, the Edge Gateway 105 stores images, image features, and models derived from the images. The System 100 is further coupled to a wide area network, such as the Internet.

In a further implementation, facial recognition is performed in a cloud computing environment as well. In an embodiment, the Cloud Platform 106 comprises a plurality of computing devices that are distributed over a plurality of geographical areas. The Cloud Platform 106 is configured to function as a server and database that stores images, image features, models, user information, etc. The databases can be distributed and support data replication, backup, indexing, etc. In one implementation, the Cloud Platform 106 is configured to store references (such as physical paths and file names) to images while the physical images are files stored in a different database to ensure redundancy and data load balancing on the database software). Usually, database is a software framework which hold all numeric type of data, in case of Image/Video data, Image/Video files are stored out of the database framework, i.e., in the computer memory and the location of such memory is referred in database. In such a case, as used herein, the database is still regarded as storing the images.

Figure 2:
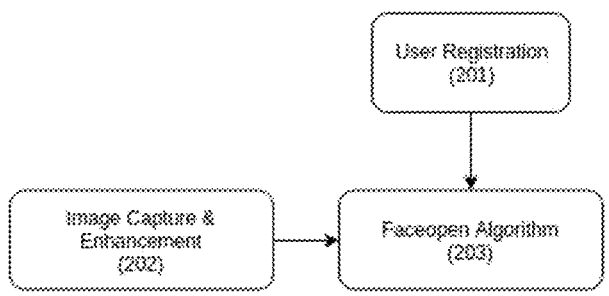
FIG. 2 illustrates a method of facial recognition and authentication, according to the preferred embodiment.

The method of facial recognition and authentication disclosed herein is presented in FIG. 2.

As shown in FIG. 2, in the preferred embodiment, the method of facial recognition and authentication 200 comprises the steps of (a) user registration 201, (b) image capture and enhancement 202, and (c) proprietary authentication algorithm 203

In order to be able to use the Face recognition & Authentication System 100, a potential user of the system must register, in the scope of the first, user authentication, step by providing the system with necessary facial images with varying angles, i.e., front, left profile and right profile of the user's face. Providing necessary facial images may be achieved in several ways: entity requiring authentication may require potential users to pose for facial images to be obtained by such entity or potential users may acquire the required facial images by using a mobile application, which is a part of the user registration step of Method 200.

Figure 3:
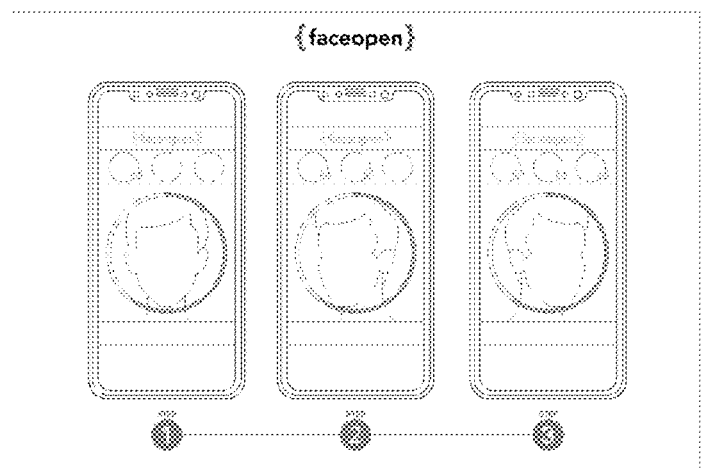
FIG. 3 illustrates a user registration method, according to the preferred embodiment.

FIG. 3. depicts one of the embodiments of user registration methods, by using a mobile application accessible to all potential users wishing to obtain permission to gain access to a certain area through an access point monitored by the System 100.

Once required images are obtained from potential users, such images are tagged and stored in the database, i.e., Edge Gateway 105 or Cloud Platform 106 of the System 100.

Once the hardware and software of the System 100 is implemented, the System 100 is automatically activated upon detecting a motion in Field of View (FOV) of one or more cameras that comprise the image capture module 103, by capturing image of person/persons at entry/exit point of controlled area.

Once an image of subject person(s) is acquired in the frame of the FOV, the System 100 generates a separate session having a unique session ID for each person detected in the frame. The System 100 stores the said separate session for each person detected in the frame of the FOV for further processing.

Upon obtaining facial image of the subject person captured by the cameras of the image capture module 103, said obtained facial images are extracted from the image capture module 103 and evaluated to determine whether the obtained facial images require an enhancement.

Figure 4:
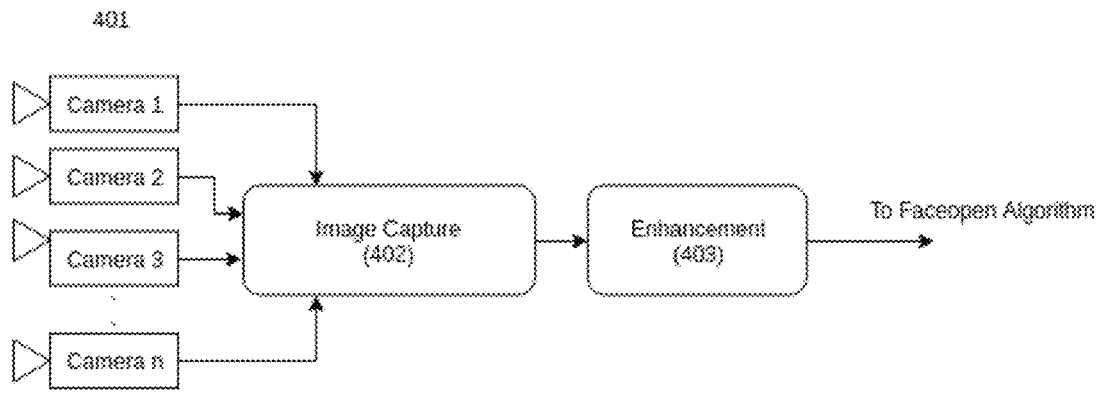
FIG. 4 illustrates a method of image capture and enhancement, according to the preferred embodiment.

FIG. 4 depicts the step of image capture and enhancement 202 of the disclosed method 200. Specifically, as described earlier, upon obtaining facial images of the subject person captured by the cameras 401 of the image capture module 103, said obtained facial images are extracted from the image capture module 103 by the image capture module 402 to evaluate the facial images to determine whether the obtained facial images require an enhancement. If the quality of the obtained facial images does not meet the predetermined threshold criteria, i.e., the obtained facial images require further enhancement, said obtained facial images are enhanced by image enhancement module 403.

Once the step of image enhancement is completed by the image enhancement module 403, the enhanced facial images are stored in the database in association with the unique session ID generated by the System 100 when the facial images were acquired by the cameras 401 of the image capture module 103. This concludes the step of image capture and enhancement 202 of the Method 200, as depicted in FIG. 2.

Returning to FIG. 2, once the step of image capture and enhancement 202 of the Method 200 is concluded, the images are analysed by the proprietary authentication algorithm in the step 203.

The step 203 of the Method 200 of FIG. 2 is the step of authentication of obtained and, if necessary, enhanced facial images and it is completed by the proprietary authentication algorithm. The proprietary authentication algorithm is a unique deep learning approach towards conducting face recognition and authentication with high accuracy and efficiency.

Figure 5:
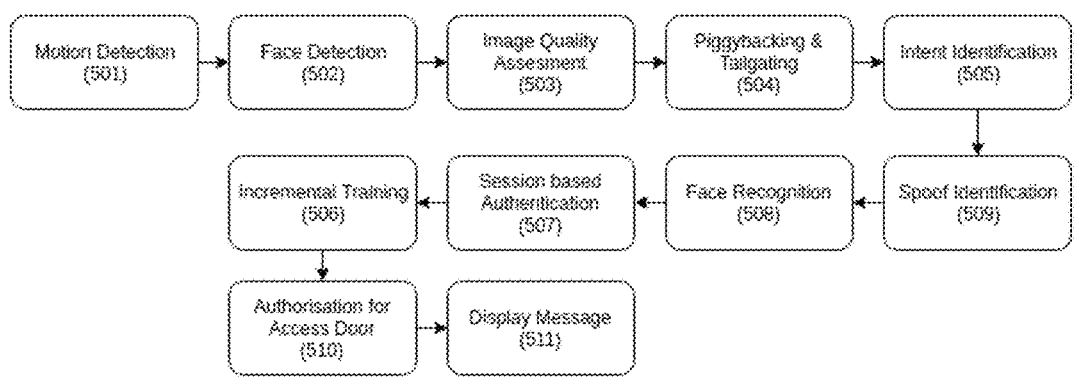
FIG. 5 illustrates an authentication algorithm, according to the preferred embodiment.

FIG. 5 depicts the proprietary authentication algorithm 500. Specifically, in the preferred embodiment, the proprietary authentication algorithm 500 comprises the following logical steps: the step of intent identification, the step of Spoof Identification, the step of Face Recognition, the step of Session Based Authentication, the step of Incremental Training, the step of Authorization for Access to Point of Entry, the step of Message Display In the preferred embodiment, the proprietary authentication algorithm 203 functions as follows. Once the user reaches the access point and enters the Field of View (FoV) of the cameras of the image capture module 103, motion in the frame is detected in motion detection module 501. Once the motion detection takes place, facial image and video capturing are commenced.

The step of face recognition and authentication algorithm is also activated for further processing of the facial image or video input. The captured video/Image will be sent to Face detection Module 502 this module will decide if there is any human face present in the given image based on facial features like eyes, mouth, nose, jaws etc.

Once the facial image is detected, in the step of quality assessment 503, a determination is made whether the detected facial image is blurry or sharp. Depending on the lighting condition at the entry point, the quality of image captured by camera varies. Filtering operation will be performed to make images Sharp & Clear so that the face recognition accuracy improves. If the captured image frame does not meet the predefined quality standard, that particular image frame will be discarded. If the image quality is below the predefined threshold value, software algorithm is configured to enhance the quality of an image in following three steps:

Blur detection: Detect whether the frame blur level is above a predetermined threshold. If the blur level is below the predetermined threshold, the image is discarded and a new image frame is obtained or chosen.

Edge Detection: Detect whether the sharpness level of an image is below the predetermined threshold of sharpness. If the sharpness of an image is below the predefined threshold, the image is discarded (or enhanced?) and a new image frame is obtained or chosen.

Upon satisfying the threshold requirements of the Blur Detection and Edge

Detection steps, the image is subjected to a Gamma correction to enhance the brightness in the image.

In case, if there are more than one face is detected, the identity all faces needs to be checked to avoid Piggybacking & Tailgating. Piggybacking refers to an occurrence of an unauthorized person walking into controlled area behind the authorized user with consent of authorized person. Tailgating refers to multiple persons entering into controlled area along with an authorized person without the consent of the authorized user. If the subject person is standing in front of the gate for some time without really moving into the access area intent identification module 505 will indicate the intention of the user. If there are large group of people authorized to enter into a specified premise, sometimes few people stand in front of the gate by engaging into conversation and block the way for others to enter the controlled area, in such scenario the camera will identify the intention and give a voice alert "Please move away from gate".

If the system detects a plurality of moving objects in the close proximity of an access control area, the system is configured to interpret such congregation as an attempt by more than one authorized person to gain access. In such scenario, the system will generate a voice alert requiring to clear the path for authorized people. Maintaining a clear path also ensures unabstracted flow of people in populous places like conferences, hospitals, and banks etc.

One of the focal point of the invention disclosed in the present application is an intent identification. The intent identification functionality of the system disclosed in the present application operates as following:

Upon detecting presence of facial landmarks in a bounding box of an image obtained by the system, an identification of a face based on the detected facial landmark is commenced.

Using the identified face and a template pose of the identified face, a head pose of moving person is calculated.

Based on a directional vector of facial landmarks and degree of directional consistency of the vector, as calculated by the system, a determination is made whether the person the person intends to gain access to the entry of the access point.

Based on identification of the person using the detected facial landmarks and based on determining the intent of the identified person, the system is configured to grant access to the identified person. For, example, even if the system recognizes a person based on the person's facial landmarks, the system is configured not to grant to the person access to the entry of the access point if the system determines the the person's intent was not to gain entry but to pass the point of entry by.

In the step of Spoof Identification 506, the Spoof Identification module is configured to detect whether the obtained facial image is live or whether it is a photo picture being shown in Field of VOC. There are some known instances where a photo picture, or a three-dimensionally printed facial image of the user were used in the attempt to gain access into the controlled area. In anticipation of such attempts, the algorithm of the system disclosed in the present application is configured to determine whether the the detected object having facial landmarks of an authorized person is live or a spoof. Specifically, the algorithm uses features like eye blinking, head movement and a combination thereof to detect the liveliness of the detected object.

The image will further be processed for face recognition 507. Specifically, upon detecting facial image in the frame, the algorithm is configured to compare the detected face with the images previously collected and stored in the database and assign a name or identifier to it.

If there are multiple people in the image, a separate session will be created for each of the person present in the picture, the session will be tracked if the person is FOV 508. In case, if the users facial feature has changed, a new picture corresponding to changed face information will be saved to database.

Further the step of incremental training 509 will be performed to include new facial information. Typically, human facial features like hairstyle, moustache keep changing frequently, Module 509 is designed to include changed features into algorithm, so that the face recognition & face authentication happens reliably. Once the image of the person at the door matches with the stored image Authorization for Door Access 510 will be given.

The display device will indicate the display message 511 to indicate whether the person at access point is given access or rejected the access.

Systems, apparatus, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be used within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer. The server may also transmit data adapted to cause a client computer to perform a specified function, e.g., to perform a calculation, to display specified data on a screen, etc.

For example, the server may transmit a request adapted to cause a client computer to perform one or more of the method steps described herein, including one or more of the steps of FIGS. 2-5. Certain steps of the methods described herein, including one or more of the steps of FIGS. 2-5, may be performed by a server or by another processor in a network-based cloud-computing system. Certain steps of the methods described herein, including one or more of the steps of FIGS. 2-5, may be performed by a client computer in a network-based cloud computing system. The steps of the methods described herein, including one or more of the steps of FIGS. 2-5, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method steps described herein, including one or more of the steps of FIGS. 2-5, may be implemented using one or more computer programs that are executable by such a processor.

A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 6:
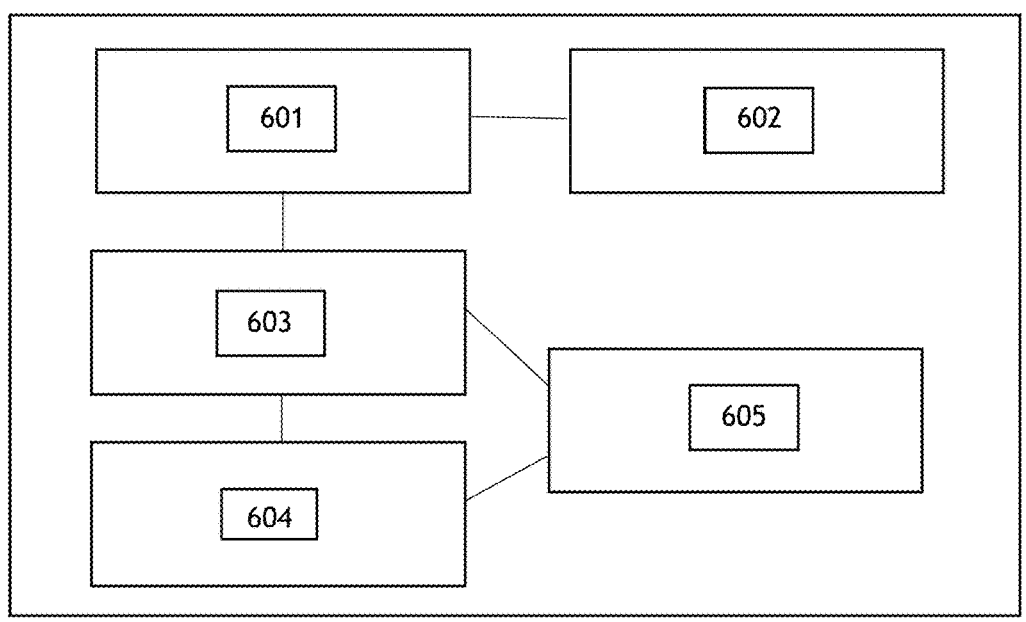
FIG. 6 illustrates high-level block diagram of an exemplary computer, according to the preferred embodiment.

A high-level block diagram of an exemplary computer that may be used to implement systems, apparatus and methods described herein is illustrated in FIG. 6. Computer system 600 comprises a processor 601 operatively coupled to a data storage device 602 and a memory 603. Processor 601 controls the overall operation of computer 600 by executing computer program instructions that define such operations.

The computer program instructions may be stored in data storage device 602, or other computer readable medium, and loaded into memory 603 when execution of the computer program instructions is desired. Thus, the method steps of FIG. 5 can be defined by the computer program instructions stored in memory 603 and/or data storage device 602 and controlled by the processor 601 executing the computer program instructions.

For example, the computer program instructions can be implemented as computer executable code programmed by one skilled in the art to perform an algorithm defined by the method steps of FIG. 5. Accordingly, by executing the computer program instructions, the processor 601 executes an algorithm defined by the method steps of FIG. 5.

Computer 600 also includes one or more network interfaces 604 for communicating with other devices via a network. Computer 600 also includes one or more input/output devices 605 that enable user interaction with computer 600 (e.g., display, keyboard, mouse, speakers, buttons, etc.).

Processor 601 may include both general and special purpose microprocessors and may be the sole processor or one of multiple processors of computer 600. Processor 601 may comprise one or more central processing units (CPUs), for example. Processor 601, data storage device 602, and/or memory 603 may include, be supplemented by, or incorporated in, one or more application-specific integrated circuits (ASICs) and/or one or more field programmable gate arrays (FPGAs).

Data storage device 602 and memory 603 each comprise a tangible non-transitory computer readable storage medium. Data storage device 602, and memory 603, may each include high-speed random access memory, such as dynamic random access memory (DRAM), static random access memory (SRAM), double data rate synchronous dynamic random access memory (DDR RAM), or other random access solid state memory devices, and may include non-volatile memory, such as one or more magnetic disk storage devices such as internal hard disks and removable disks, magneto-optical disk storage devices, optical disk storage devices, flash memory devices, semiconductor memory devices, such as erasable programmable read-only memory (EPROM), electrically erasable programmable read-only memory (EEPROM), compact disc read-only memory (CD-ROM), digital versatile disc read-only memory (DVD-ROM) disks, or other non-volatile solid state storage devices.

Input/output devices 605 may include peripherals, such as a printer, scanner, display screen, etc. For example, input/output devices 605 may include a display device such as a cathode ray tube (CRT) or liquid crystal display (LCD) monitor for displaying information to the user, a keyboard, and a pointing device such as a mouse or a trackball by which the user can provide input to computer 1200.

Any or all of the systems and apparatus discussed herein, including user recognition module 201, image capture and enhancement 202, and authentication algorithm 203, may be implemented using a computer such as computer 600.

One skilled in the art will recognize that an implementation of an actual computer or computer system may have other structures and may contain other components as well, and that FIG. 6 is a high-level representation of some of the components of such a computer for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

FIGS. 1 through 6 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention.

In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Further, it will be apparent to those of ordinary skill in the art that methods disclosed herein may be embodied in a computer program product that includes one or more computer readable media. For example, a computer readable medium can include a readable memory device, such as a hard drive device, CD-ROM, a DVD-ROM, and the like, having computer readable program code segments stored thereon. The computer readable medium can also include a communications or transmission medium, such as, a bus or a communication link, either optical, wired or wireless having program code segments carried thereon as digital or analog data signals.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method comprising:
    detecting, by a motion detection module, a motion by a subject within a predetermined area of view;
    assigning a unique session identification number to the subject detected within the predetermined area of view;
    detecting a facial area of the subject detected within the predetermined area of view;
    generating an image of the facial area of the subject;
    assessing a quality of the image of the facial area of the subject;
    determining an identity of the subject based on the image of the facial area of the subject;
    identifying an intent of the subject; and
    authorizing access to a point of entry based on the determined identity of the subject and based on the intent of the subject, wherein identifying an intent of the subject comprises:
    upon detecting the facial area in a bounding box, commencing authentication of the subject;
    calculating a directional vector of a face of the subject;
    determine an intent of the subject to gain access to the point of entry based on the directional vector of the face of the subject; and
    granting the access to the point of entry based on authentication of the subject and based on determining the intent of the subject.

2. The method of claim 1, further comprising:
  determining one or more additional subjects within the predetermined area of view; and
  assigning a unique session identification number to each of the one or more additional subjects detected within a predetermined area of view.

3. The method of claim 1, wherein the assessing a quality of the image of the facial area of the subject comprises:
  assessing whether the quality of the image of the facial area of the object equates predetermined metric of quality; and
  upon determining that the quality of the image of the facial area of the object is inferior to the predetermined metric of quality, discarding the image of the facial area of the subject and generating a second image of the facial area of the subject.

4. The method of claim 1, further comprising:
  detecting whether the facial area of the subject is photographic image; and
  upon detecting that the facial area of the subject is a photographic image, generating a warning and restrict access to the point of entry.

5. The method of claim 1, further comprising:
  conducing an incremental training of the image of the facial area of the subject.

6. The method of claim 5, wherein conducing an incremental training of the image of the facial area of the subject comprises:
  capturing a first image of the facial area having facial landmarks;
  converting the first image of the facial area into a first numeric vector;
  capturing a second image of the facial area having facial landmarks;
  converting the second image of the facial area into a second numeric vector;
  calculating a weighted mean of the first numeric vector and the second numeric vector, wherein the weighted mean represents a change in a facial area; and
  storing the weighted mean in the database.

7. The method of claim 1, wherein determining an identity of the subject based on the image of the facial area of the subject comprises:
  comparing the image of the facial area of the subject with a plurality of images stored in a database; and
  authenticating the subject.

8. A non-transitory computer readable medium having program instructions stored thereon, that in response to execution by a computing device cause the computing device to perform operations comprising:
  detecting a motion by a subject within a predetermined area of view;
  assigning a unique session identification number to the subject detected within the predetermined area of view;
  detecting a facial area of the subject detected within the predetermined area of view;
  generating an image of the facial area of the subject;
  assessing a quality of the image of the facial area of the subject;
  determining an identity of the subject based on the image of the facial area of the subject;
  identifying an intent of the subject; and
  authorizing access to a point of entry based on the determined identity of the subject and based on the intent of the subject, wherein identifying an intent of the subject comprises:
    upon detecting the facial area in a bounding box, commencing authentication of the subject;
    calculating a directional vector of a face of the subject;
    determine an intent of the subject to gain access to the point of entry based on the directional vector of the face of the subject; and
  granting the access to the point of entry based on authentication of the subject and based on determining the intent of the subject.

9. The non-transitory computer readable medium of claim 8, further comprising:
  determining one or more additional subjects within the predetermined area of view; and
  assigning a unique session identification number to each of the one or more additional subjects detected within a predetermined area of view.

10. The non-transitory computer readable medium of claim 8, wherein the assessing a quality of the image of the facial area of the subject comprises:
  assessing whether the quality of the image of the facial area of the object equates predetermined metric of quality; and
  upon determining that the quality of the image of the facial area of the object is inferior to the predetermined metric of quality, discarding the image of the facial area of the subject and generating a second image of the facial area of the subject.

11. The non-transitory computer readable medium of claim 8, further comprising:
  detecting whether the facial area of the subject is photographic image; and
  upon detecting that the facial area of the subject is a photographic image, generating a warning and restrict access to the access point.

12. The non-transitory computer readable medium of claim 8, further comprising:
  conducing an incremental training of the image of the facial area of the subject.

13. The non-transitory computer readable medium of claim 12, wherein conducing an incremental training of the image of the facial area of the subject comprises:
  capturing a first image of the facial area having facial landmarks;
  converting the first image of the facial area into a first numeric vector;
  capturing a second image of the facial area having facial landmarks;
  converting the second image of the facial area into a second numeric vector;
  calculating a weighted mean of the first numeric vector and the second numeric vector, wherein the weighted mean represents a change in a facial area; and
  storing the weighted mean in the database.

14. An apparatus for face recognition comprising:
  a processor; and
  a memory to store computer program instructions, the computer program instructions when executed on the processor cause the processor to perform operations comprising:
    detecting a motion by a subject within a predetermined area of view;
    assigning a unique session identification number to the subject detected within the predetermined area of view;
    detecting a facial area of the subject detected within the predetermined area of view;
    generating an image of the facial area of the subject;

assessing a quality of the image of the facial area of the subject;
determining an identity of the subject based on the image of the facial area of the subject;
identifying an intent of the subject; and
authorizing access to a point of entry based on the determined identity of the subject and based on the intent of the subject, wherein identifying an intent of the subject comprises:
upon detecting the facial area in a bounding box, commencing authentication of the subject;
calculating a directional vector of a face of the subject;
determine an intent of the subject to gain access to the point of entry based on the directional vector of the face of the subject; and
granting the access to the point of entry based on authentication of the subject and based on determining the intent of the subject.

15. The apparatus of claim 14, further comprising:
determining one or more additional subjects within the predetermined area of view; and
assigning a unique session identification number to each of the one or more additional subjects detected within a predetermined area of view.

16. The apparatus of claim 14, wherein the assessing a quality of the image of the facial area of the subject comprises:
assessing whether the quality of the image of the facial area of the object equates predetermined metric of quality; and
upon determining that the quality of the image of the facial area of the object is inferior to the predetermined metric of quality, discarding the image of the facial area of the subject and generating a second image of the facial area of the subject.

17. The apparatus of claim 14, further comprising:
detecting whether the facial area of the subject is photographic image; and
upon detecting that the facial area of the subject is a photographic image, generating a warning and restrict access to the access point.

18. The apparatus of claim 14, further comprising:
conducing an incremental training of the image of the facial area of the subject.

19. The apparatus of claim 14, wherein conducing an incremental training of the image of the facial area of the subject comprises:
capturing a first image of the facial area having facial landmarks;
converting the first image of the facial area into a first numeric vector;
capturing a second image of the facial area having facial landmarks;
converting the second image of the facial area into a second numeric vector;
calculating a weighted mean of the first numeric vector and the second numeric vector, wherein the weighted mean represents a change in a facial area; and
storing the weighted mean in the database.

* * * * *